A. CARPENTER & C. C. KISSELL.
CUSHIONING DEVICE FOR VEHICLES.
APPLICATION FILED OCT. 30, 1907.
904,837.
Patented Nov. 24, 1908.
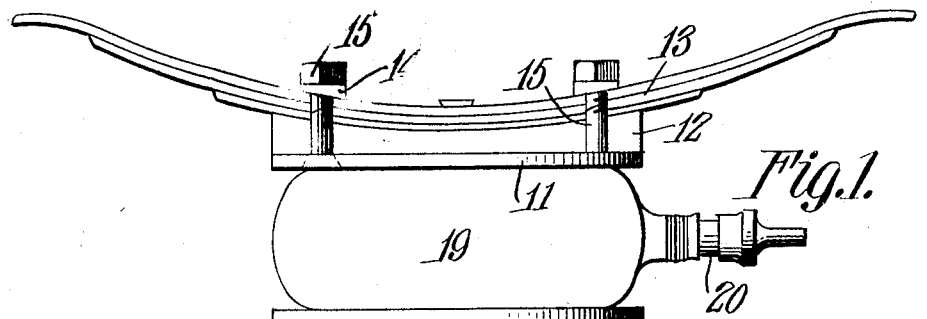
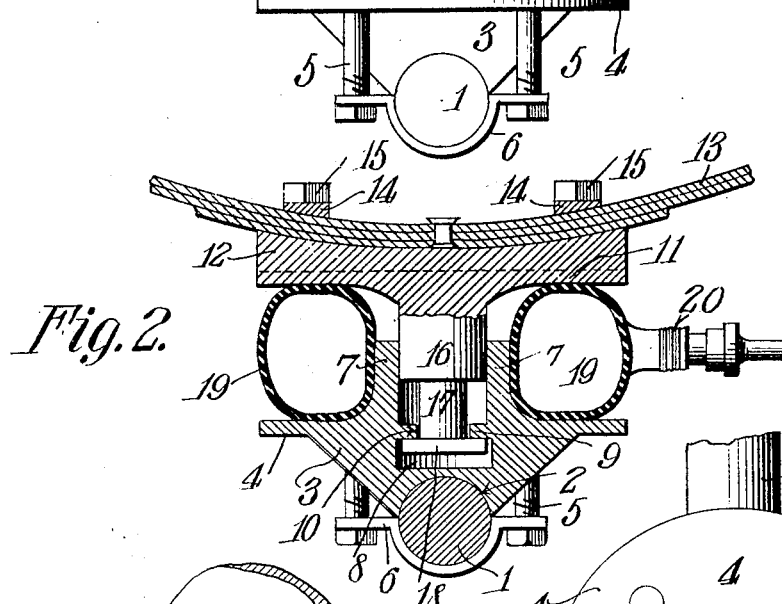
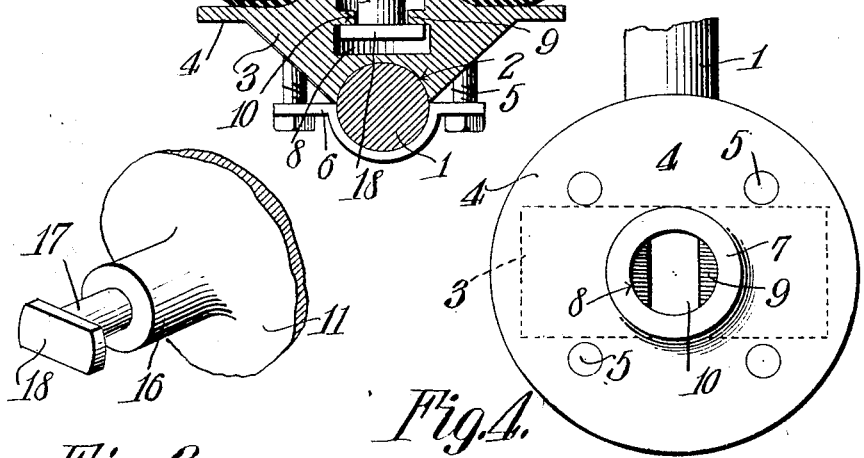
Alexander Carpenter
and Charles C. Kissell
Inventors

UNITED STATES PATENT OFFICE.

ALEXANDER CARPENTER AND CHARLES C. KISSELL, OF FINDLAY, OHIO.

CUSHIONING DEVICE FOR VEHICLES.

No. 904,837.  Specification of Letters Patent.  Patented Nov. 24, 1908.

Application filed October 30, 1907. Serial No. 399,897.

*To all whom it may concern:*

Be it known that we, ALEXANDER CARPENTER and CHARLES C. KISSELL, citizens of the United States, residing at Findlay, in the county of Hancock and State of Ohio, have invented a new and useful Cushioning Device for Vehicles, of which the following is a specification.

This invention relates to cushioning devices for vehicles and it is designed to take up the vibrations produced by a moving vehicle and thus add to the comfort of persons occupying the vehicle.

Another object is to provide pneumatic means designed to be interposed between the springs and axle of a vehicle for absorbing vibrations, said means constituting an efficient substitute for pneumatic tires.

A still further object is to provide a cushioning device of this character all parts of which are easily accessible and can be readily repaired and replaced.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a side elevation of a cushion embodying the present improvements. Fig. 2 is a section therethrough. Fig. 3 is a detail view of a portion of the top plate of the cushion. Fig. 4 is a plan view of the base plate thereof.

Referring to the figures by characters of reference, 1 designates an axle of any suitable construction seated within a socket 2 formed within the apex of a triangular extension 3 arranged on the lower face of a circular base plate 4. Its 5 extend downward from the base plate and engage the end portions of clips 6 which extend under the axle and are designed to hold it within the socket 2. A boss 7 extends upward from the center of the base plate and the socket or opening 8 therein projects downward into the extension 3 and is provided between its ends with oppositely disposed webs 9 forming a contracted portion or throat 10 substantially oblong in outline.

Arranged above the base plate 4 is a preferably circular top plate 11 having a concave rib 12 arranged diametrically thereon and constituting a seat for a spring 13 designed to be secured in place by means of clips 14 engaging bolts 15 which upstand from the plates 11 at opposite sides of the rib. A cylindrical stem 16 extends downward from the center of the plate 11 and has a reduced extension 17 the diameter of which is slightly less than the smallest dimension of the throat 10. This extension has an oblong head 18 at its free end so proportioned as to slip readily through the throat 10 when registering therewith but which is designed when the stem 17 is given a one-quarter turn, to assume a position beneath the webs 9 and prevent the withdrawal of stem 16 from the boss 7. A circular flexible tube 19 surrounds the boss 7 and is designed to be inflated through a valved stem 20 and when so inflated contacts with the adjoining faces of the plates 4 and 11 and serves to spread them apart and to hold head 18 in contact with webs 9, as shown in Fig. 2.

It is to be understood that two or more of the cushioning devices herein described are to be arranged upon each axle of a vehicle and when they are thus located all jolts or vibrations produced as a result of the movement of the vehicle will be absorbed by the pneumatic cushion 19, this absorption being permissible in view of the fact that the two plates 4 and 11 are capable of a limited movement toward each other because of the space normally formed between head 18 and the lower end of opening 8. Should it be desired to separate the two plates 4 and 11 for the purpose of repairing or replacing any of the parts it is merely necessary to turn one plate or the other until the head 18 registers with the throat 10 whereupon stem 16 can be readily withdrawn from the boss 7. A cushion such as herein described can be used in connection with vehicles of various forms such as railway cars, carriages, etc. and when used upon an automobile or the like it can be employed as a substitute for pneumatic tires because if wheels are employed having cushion or solid tires the vibrations produced will all be fully absorbed by the pneumatic cushions 19.

What is claimed is:

1. The combination with superposed members, one of said members having a socket and oppositely disposed spaced retaining webs within the socket, and an axle engaging extension depending from said member; of a stem upon the other member and movably mounted within the socket, said stem having a reduced portion movably mounted between the webs, a head upon said reduced portion and insertible between and under the webs, said head and webs coöperating to prevent separation of the members when in a predetermined relation, and a cushioning device interposed between the members.

2. A vehicle spring comprising a lower member having a depending integral axle engaging extension, means carried by said member for binding the extension upon an axle, a central boss upon said member and having a socket extending thereinto, oppositely disposed spaced retaining webs within the socket, an upper member, a central stem extending therefrom and movably mounted within the socket, said stem having a reduced portion movably mounted between the webs, a head upon said reduced portion and insertible between and under the webs, and a cushioning device interposed between the members and surrounding the boss, said boss constituting a centering device therefor.

In testimony that we claim the foregoing as our own, we have hereto affixed our signatures in the presence of two witnesses.

ALEXANDER CARPENTER.
CHARLES C. KISSELL.

Witnesses:
MARION G. FOSTER,
JAMES D. BARNETT.